(12) United States Patent
Kimura et al.

(10) Patent No.: US 11,860,097 B2
(45) Date of Patent: Jan. 2, 2024

(54) MEASURING APPARATUS THAT MEASURES HEIGHT POSITION OR THICKNESS OF MEASUREMENT-TARGET OBJECT

(71) Applicant: DISCO CORPORATION, Tokyo (JP)

(72) Inventors: Nobuyuki Kimura, Tokyo (JP); Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 82 days.

(21) Appl. No.: 17/452,099

(22) Filed: Oct. 25, 2021

(65) Prior Publication Data
US 2022/0163449 A1 May 26, 2022

(30) Foreign Application Priority Data

Nov. 20, 2020 (JP) .................................. 2020-193148

(51) Int. Cl.
*G01N 21/64* (2006.01)
*G01J 3/44* (2006.01)

(52) U.S. Cl.
CPC ........ *G01N 21/6456* (2013.01); *G01J 3/4406* (2013.01); *G01N 21/6452* (2013.01); *G01N 2021/6484* (2013.01); *G01N 2201/08* (2013.01)

(58) Field of Classification Search
CPC .......... G01N 21/6456; G01N 21/6452; G01N 2021/6484; G01N 2201/08; G01J 3/4406; G01J 1/58; G01B 11/0608; G01B 11/06; H01S 3/06708; H01S 3/093; H01S 3/0933; H01L 21/268; H01L 21/67092; G02B 6/264; G02B 27/0916; G02B 27/0955; G02B 27/141
See application file for complete search history.

(56) References Cited

U.S. PATENT DOCUMENTS

| | | | | |
|---|---|---|---|---|
| 5,606,171 A | * | 2/1997 | Neckers | G01N 21/64 |
| | | | | 250/461.1 |
| 2012/0008135 A1 | * | 1/2012 | Toker | G01B 11/0608 |
| | | | | 356/73 |
| 2012/0053299 A1 | * | 3/2012 | Popik | C07D 249/16 |
| | | | | 560/255 |
| 2020/0025615 A1 | * | 1/2020 | Spizig | G01N 21/65 |
| 2021/0148823 A1 | * | 5/2021 | Spizig | G02B 21/06 |
| 2022/0373321 A1 | * | 11/2022 | Yoshida | H01L 22/12 |

FOREIGN PATENT DOCUMENTS

| | | |
|---|---|---|
| JP | 2008170366 A | 7/2008 |
| JP | 2011122894 A | 6/2011 |
| JP | 2011143488 A | 7/2011 |

* cited by examiner

*Primary Examiner* — David P Porta
*Assistant Examiner* — Gisselle M Gutierrez
(74) *Attorney, Agent, or Firm* — Greer Burns & Crain Ltd.

(57) ABSTRACT

A measuring apparatus includes a holding table that holds a measurement-target object and a measuring unit that measures a height or a thickness of the measurement-target object held by the holding table. The measuring unit includes a light source unit, an optical fiber that guides light emitted by the light source unit, and a light collector that focuses the light guided by the optical fiber on the measurement-target object held by the holding table. The light source unit includes an excitation light source, a fluorescent body that emits fluorescence when receiving excitation light emitted by the excitation light source, and a collecting lens that focuses the excitation light emitted by the excitation light source on the fluorescent body.

12 Claims, 6 Drawing Sheets

MEASURING APPARATUS THAT MEASURES HEIGHT POSITION OR THICKNESS OF MEASUREMENT-TARGET OBJECT

BACKGROUND OF THE INVENTION

Field of the Invention

The present invention relates to a measuring apparatus that irradiates a measurement-target object with light and measures a height position or a thickness of the measurement-target object from reflected light.

Description of the Related Art

In a manufacturing step of device chips used for pieces of electronic equipment such as mobile phones and personal computers, first, plural planned dividing lines (streets) that intersect each other are set in a front surface of a wafer composed of a material such as a semiconductor. Then, a device such as an integrated circuit (IC) or large-scale integration (LSI) is formed in each region marked out by the planned dividing lines. Thereafter, when the wafer is ground from the back surface side to be thinned and is divided along the planned dividing lines, individual device chips are formed. A grinding apparatus that thins the wafer includes a holding table that can hold the wafer and a grinding unit including grinding abrasive stones that can grind the wafer. Further, the grinding apparatus includes a measuring apparatus that can monitor the height position of the upper surface of the wafer held by the holding table or the thickness of the wafer. The grinding apparatus grinds the wafer while measuring the thickness of the wafer by using this measuring apparatus, and thins the wafer to a predetermined thickness (refer to Japanese Patent Laid-Open No. 2011-143488).

Dividing of the wafer is executed, for example, by a laser processing apparatus that can execute laser processing of the wafer through irradiating the wafer with a laser beam. The laser processing apparatus includes a holding table that holds a workpiece such as a wafer and a laser beam irradiation unit that irradiates the workpiece held by the holding table with the laser beam and executes laser processing of the workpiece. Further, the laser processing apparatus includes a measuring apparatus that can measure the height position of the upper surface of the workpiece held by the holding table or the thickness of the workpiece. For example, the laser beam irradiation unit focuses the laser beam with a wavelength having transmissibility with respect to the workpiece (wavelength that allows transmission through the workpiece) on a predetermined depth position in the workpiece and forms a modified layer that becomes the origin of dividing inside the workpiece. In the laser processing apparatus, when the workpiece is irradiated with the laser beam, the height position of the upper surface or the like regarding the workpiece held by the holding table is measured by the measuring apparatus. Then, the focal point of the laser beam is positioned to a predetermined height position on the basis of the measured height position of the upper surface or the like regarding the workpiece.

The measuring apparatus includes a light source, an optical fiber that becomes the traveling path of light emitted by the light source (probe light), and a light collector that focuses the light guided by the optical fiber on a measurement-target object. Further, the measuring apparatus splits the light and focuses one of light beams generated by the splitting on the measurement-target object. In addition, the measuring apparatus irradiates a predetermined reference surface with the other light beam, and combines reflected light reflected by the upper surface and the lower surface of the measurement-target object and reflected light reflected by the reference surface and causes the combined light to travel backward to the optical fiber. Further, the measuring apparatus includes a splitting part disposed at a halfway position on the optical fiber and a diffraction grating disposed on the traveling path of the reflected light split from the optical fiber at the splitting part. Further, the measuring apparatus includes a detector that detects the reflected light diffracted by the diffraction grating and a calculating section that calculates the height position of the upper surface of a wafer, the height position of the lower surface, the thickness of the wafer, or the like from the intensity distribution of the reflected light obtained by the detector (refer to Japanese Patent Laid-Open No. 2011-122894).

Alternatively, the measuring apparatus includes a light source, an optical fiber that becomes the traveling path of light emitted by the light source, and a light collector including a chromatic aberration lens that focuses the light guided by the optical fiber on a measurement-target object. Further, when the light is focused on the measurement-target object, reflected light reflected by the upper surface of the measurement-target object returns to the optical fiber and travels backward. Further, the measuring apparatus includes a splitting part disposed at a halfway position on the optical fiber and a spectrometer that disperses the reflected light split from the optical fiber at the splitting part regarding each wavelength. Further, the measuring apparatus includes a detector that detects the reflected light dispersed by the spectrometer regarding each wavelength and a calculating section that calculates the height position of the upper surface of a wafer, the thickness of the wafer, or the like from the wavelength of the reflected light obtained by the spectrometer and the detector (refer to Japanese Patent Laid-Open No. 2008-170366).

SUMMARY OF THE INVENTION

In the existing measuring apparatus, a white light emitting diode (LED) or a halogen lamp is used as the light source of the probe light with which a measurement-target object is irradiated. Light emitted from the white LED or the like has a large spot diameter, and it is difficult to focus this light on one end of the optical fiber. For this reason, it is difficult to cause the probe light with a sufficient light amount to pass through the optical fiber, and it is impossible to irradiate a measurement-target object with the probe light with a sufficient light amount. Thus, the measurement accuracy and the resolution are insufficient. In contrast, for example, when a light source with high output power like a super continuum light source is used as the light source of the probe light, a measurement-target object can be irradiated with the probe light with a sufficient light amount finally. However, in this case, a problem that the light source becomes expensive and increases in the size is caused.

Thus, an object of the present invention is to provide a high-efficiency measuring apparatus that can irradiate a measurement-target object with light with a sufficient light amount.

In accordance with an aspect of the present invention, there is provided a measuring apparatus including a holding table that holds a measurement-target object and a measuring unit that measures a height or a thickness of the measurement-target object held by the holding table. The measuring unit includes a light source unit, an optical fiber that guides light emitted by the light source unit, and a light collector that focuses the light guided by the optical fiber on the measurement-target object held by the holding table. The light source unit includes an excitation light source, a fluorescent body that emits fluorescence with a wavelength different from that of excitation light when receiving the excitation light emitted by the excitation light source, and a first collecting lens that focuses the excitation light emitted by the excitation light source on the fluorescent body.

Preferably, the fluorescent body is disposed on a reflective substrate, and the light source unit further includes a dichroic mirror that is disposed between the first collecting lens and the fluorescent body and allows the excitation light to be transmitted through the dichroic mirror and reflects the fluorescence and a second collecting lens that focuses the fluorescence reflected by the dichroic mirror on the optical fiber.

Alternatively, preferably, the fluorescent body is disposed on a reflective substrate, and the light source unit further includes a dichroic mirror that is disposed between the first collecting lens and the fluorescent body and reflects the excitation light and allows the fluorescence to be transmitted through the dichroic mirror and a second collecting lens that focuses the fluorescence transmitted through the dichroic mirror on the optical fiber.

Further, preferably, a cooling mechanism that cools the fluorescent body is coupled to the reflective substrate on which the fluorescent body is disposed.

Further, preferably, the fluorescent body is disposed on a transparent substrate, and the light source unit further includes a second collecting lens that focuses the fluorescence that is emitted by the fluorescent body and that is transmitted through the transparent substrate on the optical fiber.

Further, preferably, the fluorescent body is disposed with a shape including an annular region on the transparent substrate that has a rotating shaft and that is circular, and the light source unit further includes a rotational drive source that suppresses a temperature rise of the fluorescent body by rotating the transparent substrate around the rotating shaft.

Further, preferably, the fluorescent body is disposed with a shape including an annular region on the reflective substrate that has a rotating shaft and that is circular, and the light source unit further includes a rotational drive source that suppresses a temperature rise of the fluorescent body by rotating the reflective substrate around the rotating shaft.

Further, preferably, the fluorescent body is buried in the optical fiber.

Alternatively, preferably, the fluorescent body is disposed on an end surface of the optical fiber.

Further, preferably, the excitation light source is a laser diode.

The measuring apparatus according to the aspect of the present invention includes the light source unit having the excitation light source, the fluorescent body, and the first collecting lens. The excitation light output from the excitation light source is focused on the fluorescent body by the first collecting lens, and the fluorescent body is caused to generate the fluorescence with a wavelength different from that of the excitation light. Further, the measurement-target object can be irradiated with this fluorescence through the optical fiber and the light collector. In this case, the fluorescence including a wide wavelength band that can be used for measurement can be formed with use of a monochromatic light source having high output power and a small spot diameter. Further, this fluorescence also has a small diameter, and therefore it is easy to focus the fluorescence on an end surface of the optical fiber. Thus, in the measuring apparatus according to the aspect of the present invention, the measurement-target object can be irradiated with the light (probe light) including the fluorescence with high efficiency with a sufficient light amount without using an expensive, large-size light source like a super continuum light source.

Therefore, according to the aspect of the present invention, a high-efficiency measuring apparatus that can irradiate a measurement-target object with light with a sufficient light amount is provided.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

An embodiment of the present invention will be described in detail below with reference to the accompanying drawings. A measuring apparatus according to the present embodiment is used in such a manner as to be incorporated in a processing apparatus that processes a workpiece such as a semiconductor wafer, for example. In the processing apparatus, the height position of the upper surface or the bottom surface or the thickness regarding the workpiece is measured by the measuring apparatus. That is, the measuring apparatus deems the workpiece to be processed by the processing apparatus as a measurement-target object and measures the height position of the upper surface or the bottom surface or the thickness regarding the workpiece.

Figure 2:
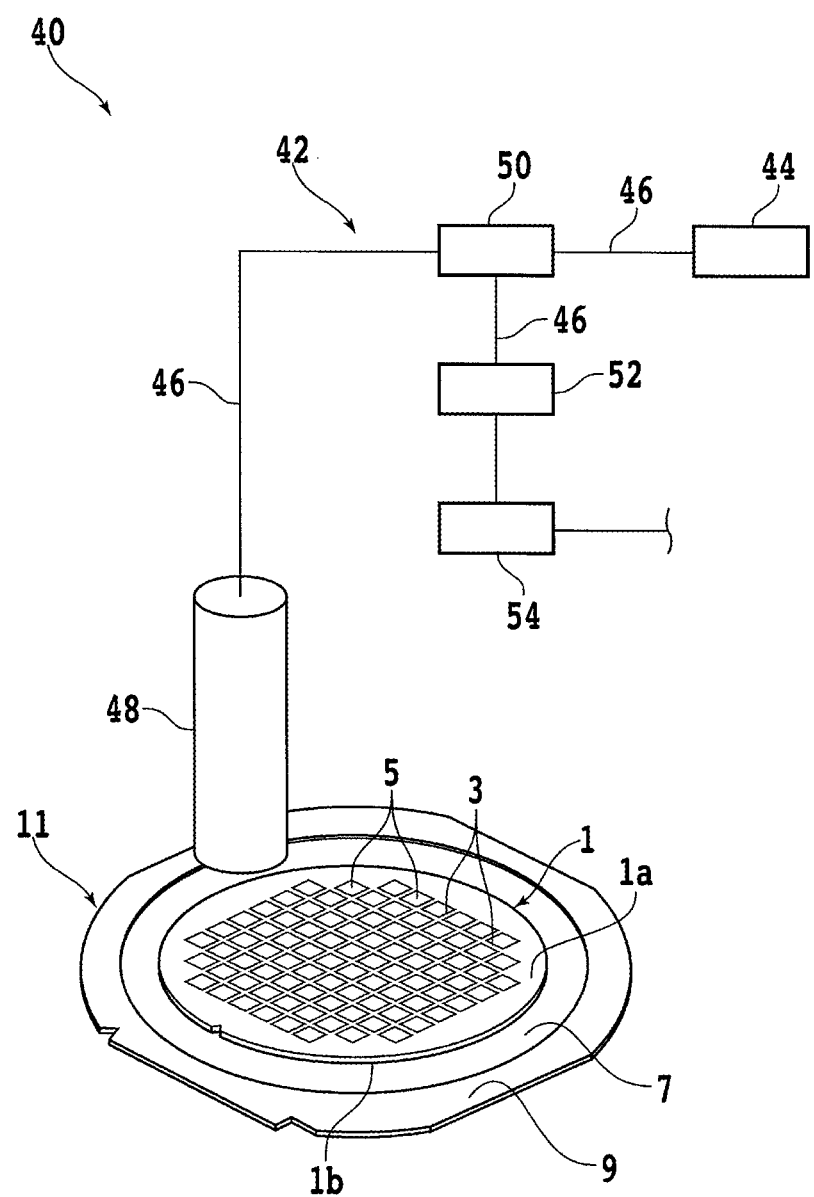
FIG. 2 is a block diagram schematically illustrating a basic configuration of the measuring apparatus.

First, the measurement-target object of the measuring apparatus according to the present embodiment will be described. The measurement-target object becomes a workpiece of a processing apparatus. In FIG. 2, a perspective view of a wafer 1 that becomes the measurement-target object (workpiece) is included. The measurement-target object is the wafer 1 that has a circular plate shape and is composed of a material such as silicon (Si), silicon carbide (SiC), gallium nitride (GaN), gallium arsenide (GaAs), or another semiconductor, for example. Alternatively, the measurement-target object is a substrate or the like that is composed of a material such a sapphire, glass, or quartz and has a substantially circular plate shape. The glass is, for example, alkali glass, non-alkali glass, soda-lime glass, lead glass, borosilicate glass, quartz glass, or the like. The measurement-target object may be a package substrate, ceramic substrate, or the like. In the following, description will be made by taking as an example the case in which the measurement-target object is the wafer 1 with a circular plate shape.

A front surface 1a of the wafer 1 is segmented by plural planned dividing lines 3 arranged in a lattice manner. A device 5 such as an IC or LSI is formed in each region marked out by the planned dividing lines 3 of the front surface 1a of the wafer 1. Further, when the wafer 1 is ground from a back surface 1b to be thinned and the wafer 1 is divided along the planned dividing lines 3, individual device chips are obtained. The grinding of the wafer 1 is executed by a grinding apparatus including grinding abrasive stones. Further, the dividing of the wafer 1 is executed by a laser processing apparatus that irradiates the wafer 1 with a laser beam and executes laser processing of the wafer 1. Further, the measuring apparatus according to the present embodiment is used in such a manner as to be incorporated in a processing apparatus such as the grinding apparatus or the laser processing apparatus, for example. The laser processing apparatus will be described below as one example of the processing apparatus in which the measuring apparatus according to the present embodiment is incorporated to be used.

For example, the wafer 1 is stuck to a tape 7 stuck to an annular frame 9 in advance. That is, a frame unit 11 in which the wafer 1, the tape 7, and the annular frame 9 are integrated is formed in advance. Then, the wafer 1 in the state of the frame unit 11 is carried in to the laser processing apparatus and is processed.

Figure 1:
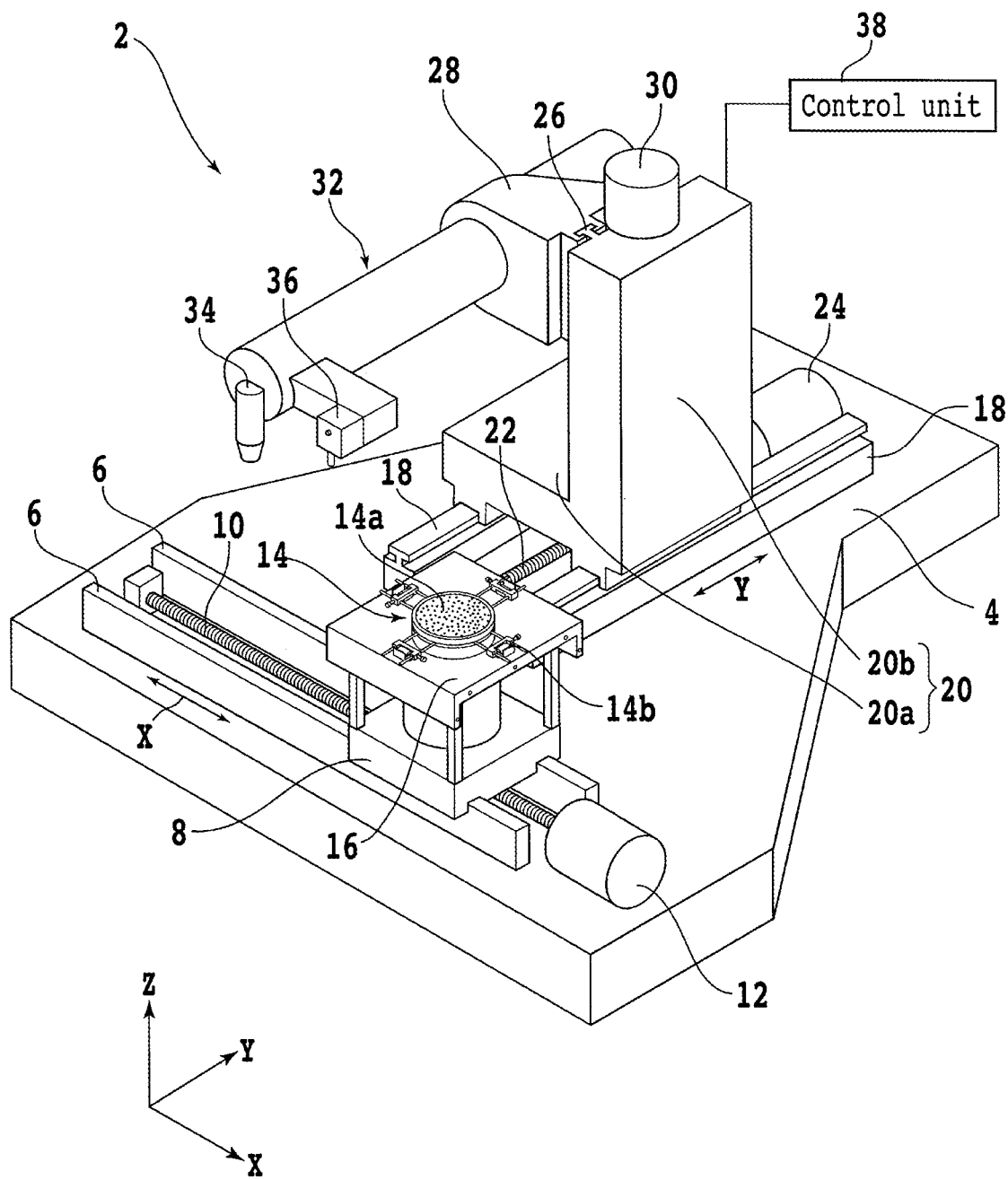
FIG. 1 is a perspective view schematically illustrating a laser processing apparatus in which a measuring apparatus is incorporated.

FIG. 1 is a perspective view schematically illustrating a laser processing apparatus 2. The laser processing apparatus 2 includes a base 4 that supports the respective constituents. A pair of X-axis guide rails 6 parallel to an X-axis direction are disposed at the front part of the upper surface of the base 4, and an X-axis moving plate 8 is slidably attached to the X-axis guide rails 6.

A nut part (not illustrated) is disposed on the lower surface side of the X-axis moving plate 8, and an X-axis ball screw 10 parallel to the X-axis guide rails 6 is screwed to this nut part. An X-axis pulse motor 12 is coupled to one end of the X-axis ball screw 10. A support pedestal 16 that supports a holding table 14 is disposed over the X-axis moving plate 8, and the holding table 14 is disposed on the support pedestal 16. The holding table 14 includes a porous component exposed upward and a frame body that houses the porous component in a recessed part. A suction path that causes the porous component to communicate with a suction source is formed inside the frame body. When a workpiece (measurement-target object) is placed on the porous component and the suction source is actuated, a negative pressure acts on the workpiece and the workpiece is held under suction by the holding table 14. That is, the upper surface of the porous component becomes a holding surface 14a. Around the holding table 14, clamps 14b that fix the annular frame 9 that holds the workpiece through the tape 7 are disposed.

When the X-axis ball screw 10 is rotated by the X-axis pulse motor 12, the X-axis moving plate 8 moves in the X-axis direction along the X-axis guide rails 6. The pair of X-axis guide rails 6, the X-axis moving plate 8, the X-axis ball screw 10, and the X-axis pulse motor 12 function as an X-axis direction movement mechanism that moves the workpiece held by the holding table 14 in the X-axis direction.

A pair of Y-axis guide rails 18 along a Y-axis direction perpendicular to the X-axis direction are disposed at the rear part of the upper surface of the base 4 of the laser processing apparatus 2. A support body 20 is slidably attached to the Y-axis guide rails 18. The support body 20 includes a base part 20a attached to the Y-axis guide rails 18 and a wall part 20b disposed upright on the base part 20a. A nut part (not illustrated) is disposed on the lower surface side of the base part 20a of the support body 20, and a Y-axis ball screw 22 parallel to the Y-axis guide rails 18 is screwed to this nut part. A Y-axis pulse motor 24 is coupled to one end of the Y-axis ball screw 22. When the Y-axis ball screw 22 is rotated by the Y-axis pulse motor 24, the support body 20 moves in the Y-axis direction along the Y-axis guide rails 18. The pair of Y-axis guide rails 18, the Y-axis ball screw 22, and the Y-axis pulse motor 24 function as a Y-axis direction movement mechanism that moves a laser processing unit 32 to be described later in the Y-axis direction.

A pair of Z-axis guide rails 26 along a Z-axis direction perpendicular to the X-axis direction and the Y-axis direction are disposed on the rear surface side of the wall part 20b of the support body 20. A unit holder 28 is slidably attached to the Z-axis guide rails 26. A nut part (not illustrated) is disposed on a surface that faces the wall part 20b in the unit holder 28, and a Z-axis ball screw (not illustrated) parallel to the Z-axis guide rails 26 is screwed to this nut part. A Z-axis pulse motor 30 is coupled to one end of the Z-axis ball screw. When the Z-axis ball screw is rotated by the Z-axis pulse motor 30, the unit holder 28 moves in the Z-axis direction along the Z-axis guide rails 26. The pair of Z-axis guide rails 26, the Z-axis ball screw, and the Z-axis pulse motor 30 function as a raising-lowering unit that raises and lowers the laser processing unit 32 in the Z-axis direction.

Some of constituents of the laser processing unit 32 are fixed to the unit holder 28. The laser processing unit 32 has a function of irradiating a workpiece held on the holding surface 14a of the holding table 14 with a laser beam to execute laser processing of the workpiece. The laser processing unit 32 includes a laser oscillator that includes a medium of Nd:YAG, Nd:YVO4, or the like, for example, and emits the laser beam. The laser processing unit 32 can irradiate a workpiece with the laser beam with a wavelength that allows transmission through the workpiece (wavelength having transmissibility with respect to the workpiece). The laser processing unit 32 includes a processing head 34 located over the holding table 14 and an imaging unit 36 adjacent to the processing head 34. The imaging unit 36 can image a surface of the workpiece held by the holding table 14 and is used when alignment is executed to allow the workpiece to be irradiated with the laser beam along the planned dividing line 3. Further, the measuring apparatus according to the present embodiment is incorporated in the laser processing unit 32, and the measuring apparatus shares part of the optical system with the laser processing unit 32.

Further, the laser processing apparatus 2 includes a control unit 38 that controls the respective constituents of the laser processing apparatus 2. The control unit 38 is configured by a computer including a processing device such as a central processing unit (CPU), a main storing device such as a dynamic random access memory (DRAM), and an auxiliary storing device such as a flash memory. The processing device and so forth are operated in accordance with software stored in the auxiliary storing device, and thereby the control unit 38 functions as specific means in which the software and the processing device (hardware resources) cooperate.

The laser processing unit 32 focuses the laser beam on a predetermined height position inside the workpiece held by the holding table 14. In order to position the focal point of the laser beam to a predetermined depth position in the workpiece, the laser processing apparatus 2 measures, by the measuring apparatus, the height position of the upper surface or the thickness of the workpiece held by the holding table 14. The focal point is positioned inside the workpiece at a position that overlaps with the planned dividing line 3, and the holding table 14 and the laser processing unit 32 are relatively moved in a direction parallel to the holding surface 14a (X-axis direction or Y-axis direction) while the laser beam is focused on the focal point. Along with this, the workpiece is irradiated with the laser beam along the planned dividing line and laser processing of the workpiece is executed along the planned dividing line, so that a modified layer that becomes the origin of dividing is formed inside the workpiece.

Next, the measuring apparatus according to the present embodiment will be described. The measuring apparatus measures the height of the upper surface or the thickness of a measurement-target object held by a holding table. When the measuring apparatus is used in such a manner as to be incorporated in the laser processing apparatus 2, the holding table 14 of the laser processing apparatus 2 may double as the function of the holding table of the measuring apparatus. FIG. 2 is a block diagram schematically illustrating a basic configuration of a measuring apparatus 40 according to the present embodiment. However, the holding table is omitted in FIG. 2. The measuring apparatus 40 includes a measuring unit 42 that measures the height or the thickness of a measurement-target object held by the holding table. The measuring unit 42 includes a light source unit 44, an optical fiber 46 that guides light emitted by the light source unit 44, and a light collector 48 that focuses the light guided by the optical fiber 46 (probe light) on the measurement-target object. The light collector 48 includes a collecting lens that can focus the probe light on the measurement-target object held by the holding table.

In the measuring apparatus 40, the probe light emitted by the light source unit 44 is collected and is made incident on one end of the optical fiber 46. Then, the probe light that gets out from the other end of the optical fiber 46 is focused on the measurement-target object by the light collector 48. The probe light applied to the measurement-target object is reflected by the measurement-target object, and part of the reflected light travels to the light collector 48. A splitting part 50 is disposed at a halfway position on the optical fiber 46, and the reflected light that travels backward in the optical fiber 46 is split by the splitting part 50. The measuring apparatus 40 detects this reflected light to thereby measure the height of the upper surface or the like regarding the measurement-target object and identify the thickness of the measurement-target object. For example, a diffraction grating 52 and a detector (image sensor) 54 are disposed at the tip of the optical fiber 46 made to branch, and the height position of the upper surface or the like regarding the measurement-target object can be calculated by analyzing the reflected light detected by the detector 54. Alternatively, for example, a spectrometer (not illustrated) that disperses the reflected light and identifies wavelengths of the reflected light is disposed at the tip of the optical fiber 46 made to branch, and the height position or the like of the measurement-target object can be calculated from the wavelengths of the reflected light.

The detector 54 or the spectrometer is connected to the control unit 38 (see FIG. 1) of the laser processing apparatus 2 in which the measuring apparatus 40 is incorporated, and the control unit 38 analyzes the reflected light and calculates the height position of the upper surface or the like regarding the measurement-target object. That is, the control unit 38 can function also as a calculating section of the measuring apparatus 40.

In the existing measuring apparatus, a white LED or a halogen lamp is used as the light source of the probe light. Light emitted from the white LED or the like has a large spot diameter, and it is difficult to focus this light on one end of the optical fiber 46. For this reason, it is difficult to cause light with a sufficient amount to pass through the optical fiber, and it is impossible to irradiate a measurement-target object with the probe light with a sufficient light amount. Thus, the measurement accuracy and the resolution are insufficient. In contrast, for example, when a light source with high output power like a super continuum light source is used as the light source of the probe light, a measurement-target object can be irradiated with white light with a sufficient light amount finally. However, in this case, a problem that the light source becomes expensive and increases in the size is caused.

Thus, in the measuring apparatus 40 according to the present embodiment, a light source with high output power and a small spot diameter, such as a blue or violet laser diode (LD), is used and a fluorescent body is irradiated with light emitted from the light source as excitation light to obtain probe light with high output power including generated fluorescence. The spot diameter of the fluorescence thus obtained is small, and therefore it is easy to focus the fluorescence on an end surface of the optical fiber 46. Although the light emitted by the LD has high output power, light with a specific wavelength (monochromatic light) is not suitable for measurement of the height position of the upper surface of the measurement-target object. Thus, the fluorescent body is irradiated with the light emitted by the LD as excitation light to generate the fluorescence with a wider wavelength band than the excitation light, and the measurement-target object is irradiated with the probe light including this fluorescence.

Figure 3A:
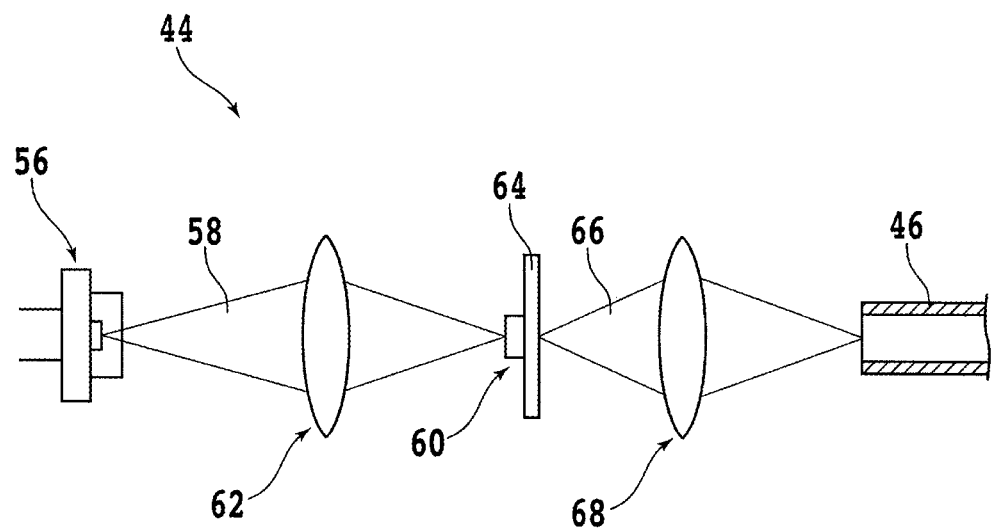
FIG. 3A is a side view schematically illustrating one example of an optical system of the measuring apparatus.

The configuration of the light source unit 44 of the measuring apparatus 40 according to the present embodiment will be described below. FIG. 3A is a side view schematically illustrating one example of the optical system of the measuring apparatus 40 according to the present embodiment. In FIG. 3A, the light source unit 44 and an end part of the optical fiber 46 are schematically illustrated. The light source unit 44 includes an excitation light source 56, a fluorescent body 60 that emits fluorescence with a wavelength different from that of excitation light 58 when receiving the excitation light 58 emitted by the excitation light source 56, and a first collecting lens 62 that focuses the excitation light 58 emitted by the excitation light source 56 on the fluorescent body 60. The fluorescent body 60 on which the excitation light 58 is focused is disposed on one surface of a transparent substrate 64 that allows light in a wavelength band in a visible light region to be transmitted through the transparent substrate 64, for example. The light source unit 44 further has a second collecting lens 68 that focuses fluorescence emitted by the fluorescent body 60 toward an end surface of the optical fiber 46.

For the excitation light source 56, an LD that generates short-wavelength light of blue, violet, or the like is used. For the fluorescent body 60, a material that can receive the excitation light 58 emitted by the excitation light source 56 and emit fluorescence in a band of wavelength that is different from that of the excitation light 58 and is longer than that of the excitation light 58 is used. Specifically, a material that receives the short-wavelength excitation light 58 of blue, violet, or the like and generates long-wavelength fluorescence of green, yellow, red, or the like can be used. More specifically, for the fluorescent body 60, a material such as yttrium aluminum oxide:cerium (Y3Al5O12:Ce) or yttrium gadolinium aluminum oxide:cerium ((Y, Gd)3Al5O12:Ce) can be used. However, the material of the fluorescent body 60 is not limited to them.

When the fluorescent body 60 is irradiated with the excitation light 58, fluorescence is generated. Then, probe light 66 including this fluorescence is transmitted through the transparent substrate 64. Part of the excitation light 58 transmitted through the fluorescent body 60 may be included in the probe light 66. The second collecting lens 68 focuses the probe light 66 toward the end surface of the optical fiber 46. The light collector (see FIG. 2) is connected to the end surface on the opposite side to this end surface in the optical fiber 46, and a measurement-target object is irradiated with the probe light 66 including the fluorescence emitted by the fluorescent body 60.

Here, it is desirable that the probe light 66 is light like white light with a wide wavelength band, for identifying the height position of the upper surface or the like regarding the measurement-target object with high accuracy by the measuring apparatus 40. However, the probe light 66 does not need to be white light that strictly conforms to the definition, and it is also unnecessary that light of all wavelengths is included in the probe light 66 with uniform intensity distribution or specific intensity distribution. That is, the probe light 66 needs to be at least non-monochromatic light that is not monochromatic light composed only of a specific wavelength component and is preferably light having plural wavelength components irrespective of the intensity distribution. Here, it is also possible that the light having plural wavelength components irrespective of the intensity distribution is referred to as light having a wavelength band. The fluorescent body 60 emits fluorescence having a wavelength band by receiving the excitation light 58 emitted by the excitation light source 56. Further, the probe light 66 is light having a wavelength band including this fluorescence and is light different from the excitation light 58.

Figure 4A:
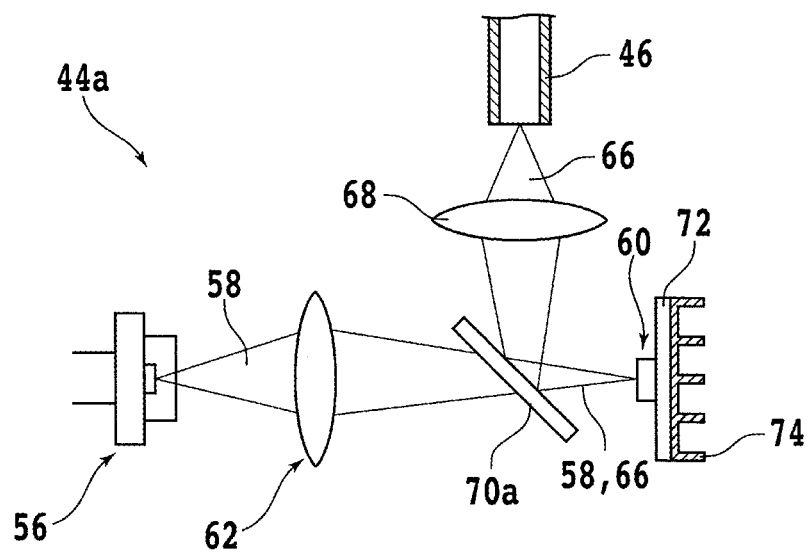
FIG. 4A is a side view schematically illustrating one example of the optical system of the measuring apparatus.

Next, another example of the optical system of the measuring apparatus 40 according to the present embodiment will be described. In FIG. 4A, an optical system according to another example of the measuring apparatus 40 is schematically illustrated. In a light source unit 44a illustrated in FIG. 4A, the fluorescent body 60 is disposed on a reflective substrate 72. Further, the light source unit 44a includes a dichroic mirror 70a disposed between the first collecting lens 62 and the fluorescent body 60. In the light source unit 44a, the dichroic mirror 70a having such an optical characteristic as to allow the excitation light 58 to be transmitted through the dichroic mirror 70a and be capable of reflecting the fluorescence generated by the fluorescent body 60 is incorporated. The light source unit 44a further includes the second collecting lens 68 that focuses the probe light 66 including the fluorescence reflected by the dichroic mirror 70a on the optical fiber 46.

The excitation light source 56, the first collecting lens 62, the fluorescent body 60, and the second collecting lens 68 in the light source unit 44a illustrated in FIG. 4A are configured similarly to the light source unit 44 illustrated in FIG. 3A. In the light source unit 44a, fluorescence is generated when the excitation light 58 generated by the excitation light source 56 travels through the first collecting lens 62 and the dichroic mirror 70a and is applied to the fluorescent body 60. Then, the probe light 66 including this fluorescence travels to the dichroic mirror 70a. Part of the excitation light 58 reflected by the reflective substrate 72 may be included in the probe light 66. The probe light 66 is reflected by the dichroic mirror 70a and travels to the second collecting lens 68. Then, the second collecting lens 68 focuses the probe light 66 toward an end surface of the optical fiber 46. As above, also in the light source unit 44a illustrated in FIG. 4A, the probe light 66 including the fluorescence generated by the fluorescent body 60 can be focused on the end surface of the optical fiber 46.

Figure 4B:
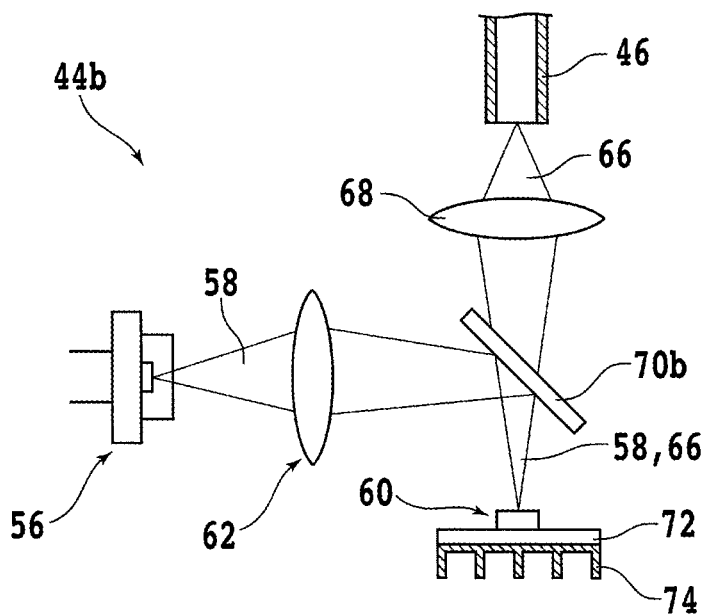
FIG. 4B is a side view schematically illustrating one example of the optical system of the measuring apparatus.

Further another example of the optical system of the measuring apparatus 40 according to the present embodiment will be described. In FIG. 4B, an optical system according to another example of the measuring apparatus 40 is schematically illustrated. Also in a light source unit 44b illustrated in FIG. 4B, the fluorescent body 60 is disposed on the reflective substrate 72. The light source unit 44b includes a dichroic mirror 70b disposed on an optical path between the first collecting lens 62 and the fluorescent body 60. In the light source unit 44b, the dichroic mirror 70b having such an optical characteristic as to be capable of reflecting the excitation light 58 and allow fluorescence generated by the fluorescent body 60 to be transmitted through the dichroic mirror 70b is incorporated. The light source unit 44b further includes the second collecting lens 68 that focuses the fluorescence transmitted through the dichroic mirror 70b on the optical fiber 46.

The excitation light source 56, the first collecting lens 62, the fluorescent body 60, and the second collecting lens 68 in the light source unit 44b illustrated in FIG. 4B are configured similarly to the light source unit 44a illustrated in FIG. 4A. In the light source unit 44b, the excitation light 58 generated by the excitation light source 56 travels through the first collecting lens 62 and is reflected by the dichroic mirror 70b to be applied to the fluorescent body 60. When the excitation light 58 is focused on the fluorescent body 60, fluorescence is generated. Then, the probe light 66 including this fluorescence is transmitted through the dichroic mirror 70b and travels to the second collecting lens 68. Part of the excitation light 58 reflected by the reflective substrate 72 may be included in the probe light 66. Then, the second collecting lens 68 focuses the probe light 66 toward an end surface of the optical fiber 46. As above, also in the light source unit 44b illustrated in FIG. 4B, the probe light 66 including the fluorescence generated by the fluorescent body 60 can be focused on the end surface of the optical fiber 46.

Here, when the excitation light 58 generated by the excitation light source 56 continues to be focused on the fluorescent body 60 by the first collecting lens 62, the fluorescent body 60 is heated and damage is caused to the fluorescent body 60, so that the characteristic of the generated fluorescence, such as the intensity, changes in some cases. Thus, the measuring apparatus 40 may include a cooling mechanism that cools the fluorescent body 60 and suppresses the temperature rise of the fluorescent body 60. For example, as illustrated in each of FIG. 4A and FIG. 4B, a cooling mechanism 74 such as a heat dissipation plate (heat sink) formed of a material with high thermal conductivity, such as a metal, is disposed for the reflective substrate 72 that supports the fluorescent body 60. Heat generated by the fluorescent body 60 continues to be removed by the cooling mechanism 74, and therefore the temperature rise of the fluorescent body 60 irradiated with the excitation light 58 is suppressed. However, the cooling mechanism that cools the fluorescent body 60 is not limited thereto. For example, the cooling mechanism 74 may be configured by a cooling fan driven by a power supply in addition to the heat dissipation plate formed of a metal or the like. When the cooling fan is operated and air is blown to the heat dissipation plate, heat can be efficiently removed from the heat dissipation plate, and therefore the fluorescent body 60 can be actively cooled.

Figure 5A:
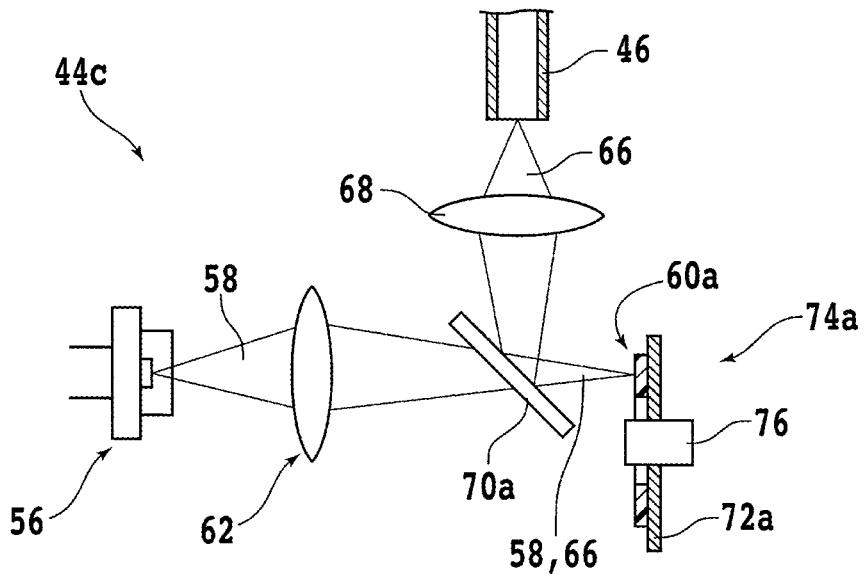
FIG. 5A is a side view schematically illustrating one example of the optical system of the measuring apparatus.

The measuring apparatus 40 according to the present embodiment may include a cooling mechanism of further another form. In FIG. 5A, a light source unit 44c including a cooling mechanism 74a of another form instead of the cooling mechanism 74 formed of the heat dissipation plate in the light source unit 44a illustrated in FIG. 4A is schematically illustrated. Further, in FIG. 5B, a light source unit 44d including the cooling mechanism 74a of the other form instead of the cooling mechanism 74 formed of the heat dissipation plate in the light source unit 44b illustrated in FIG. 4B is schematically illustrated.

Figure 5B:
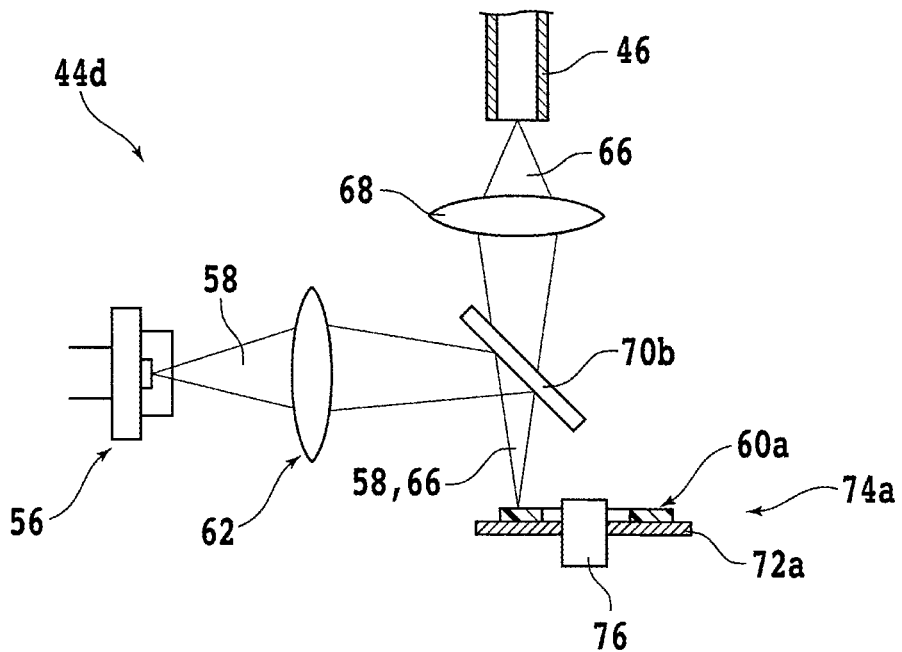
FIG. 5B is a side view schematically illustrating one example of the optical system of the measuring apparatus.

In the light source units 44c and 44d illustrated in FIG. 5A and FIG. 5B, a fluorescent body 60a is annularly disposed on a circular reflective substrate 72a having a rotating shaft 76. In FIG. 5A and FIG. 5B, a sectional view of the fluorescent body 60a and the reflective substrate 72a is included. A rotational drive source that is not illustrated in the diagram is connected to the base end part of the rotating shaft 76. When actuating the excitation light source 56, the light source units 44c and 44d rotate the reflective substrate 72a around the rotating shaft 76. In this case, the position irradiated with the excitation light 58 on the fluorescent body 60a annularly disposed on the reflective substrate 72a always changes. Thus, the situation in which the excitation light 58 is focused on a specific place on the fluorescent body 60a, and the specific place continues to be heated does not occur. Further, in the period from irradiation of a certain place on the fluorescent body 60a with the excitation light 58 to the next irradiation of this place with the excitation light 58, this place is cooled. That is, the temperature rise of the fluorescent body 60a is suppressed.

Figure 3B:
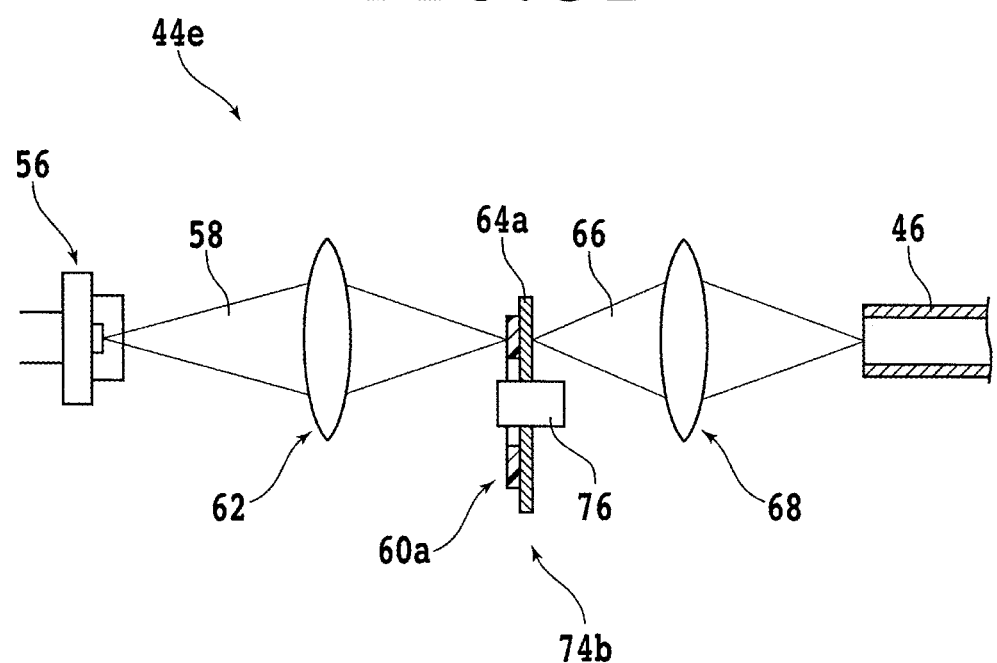
FIG. 3B is a side view schematically illustrating one example of the optical system of the measuring apparatus.

The fluorescent body 60a disposed on the reflective substrate 72a does not have to be annular. For example, it suffices that the fluorescent body 60a is disposed on the reflective substrate 72a with a shape including an annular region that becomes the movement path of the position irradiated with the excitation light 58 on the reflective substrate 72a when the reflective substrate 72a is rotated. Further, the cooling mechanism that rotates the fluorescent body by the rotational drive source may be incorporated in the light source unit 44 in which the fluorescent body 60 is supported by the transparent substrate 64 like that illustrated in FIG. 3A. In FIG. 3B, a light source unit 44e including a cooling mechanism 74b is schematically illustrated.

In the light source unit 44e illustrated in FIG. 3B, the fluorescent body 60a is disposed with a shape including an annular region on a circular transparent substrate 64a having the rotating shaft 76. In FIG. 3B, a sectional view of the fluorescent body 60a and the transparent substrate 64a is included. A rotational drive source that is not illustrated in the diagram is connected to the base end part of the rotating shaft 76. When actuating the excitation light source 56, the light source unit 44e rotates the transparent substrate 64a around the rotating shaft 76. In this case, the position irradiated with the excitation light 58 on the fluorescent body 60a disposed on the transparent substrate 64a always changes. Thus, the excitation light 58 does not continue to be focused on a specific place on the fluorescent body 60a, and the specific place also does not continue to be heated. In the period from irradiation of a certain place on the fluorescent body 60a with the excitation light 58 to the next irradiation of this place with the excitation light 58, this place is cooled. That is, the temperature rise of the fluorescent body 60a is suppressed.

Figure 6A:
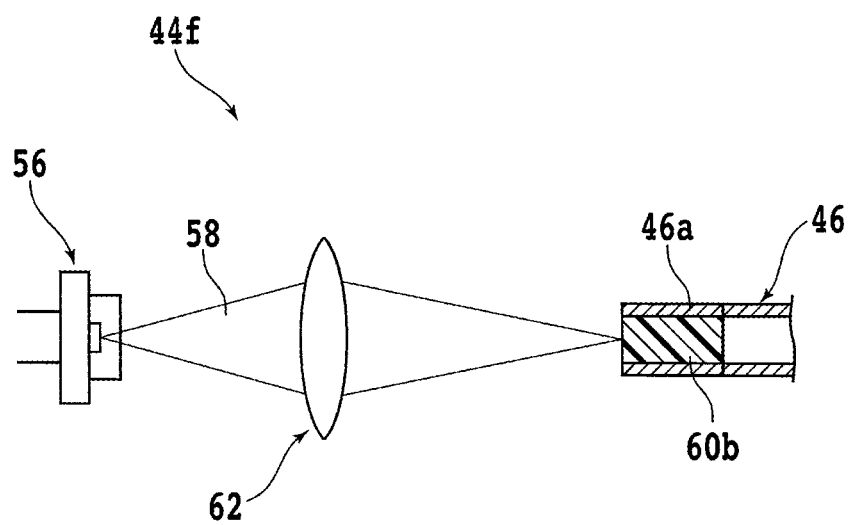
FIG. 6A is a side view schematically illustrating one example of the optical system of the measuring apparatus.
Figure 6B:
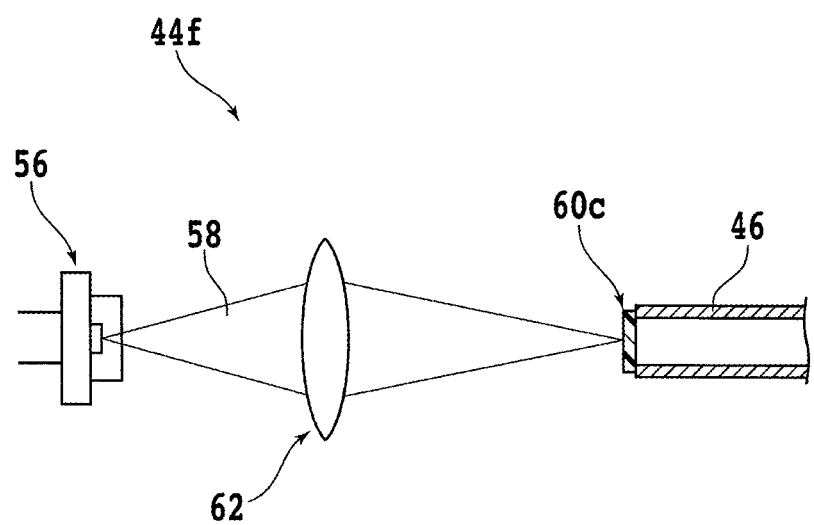
FIG. 6B is a side view schematically illustrating one example of the optical system of the measuring apparatus.

In the measuring apparatus 40 according to the present embodiment, the fluorescent body that is irradiated with the excitation light 58 generated by the excitation light source 56 and generates fluorescence used for the probe light 66 does not have to be supported by the transparent substrate 64 or the reflective substrate 72. For example, the fluorescent body may be disposed directly at the optical fiber 46. In a light source unit 44f illustrated in FIG. 6A, a fluorescent body 60b is buried in an optical fiber 46a, and the excitation light 58 generated by the excitation light source 56 is focused on the fluorescent body 60b buried in the optical fiber 46a by the first collecting lens 62. For example, the light source unit 44f illustrated in FIG. 6A can be formed by connecting the optical fiber 46a formed of a quartz tube inside which the fluorescent body 60b is buried to an end part of the optical fiber 46. Fluorescence generated by the fluorescent body 60b travels to an end surface of the optical fiber 46 as it is. Further, in a light source unit 44g illustrated in FIG. 6B, a fluorescent body 60c is disposed on an end surface of the optical fiber 46, and the excitation light 58 generated by the excitation light source 56 is focused on the fluorescent body 60c disposed on the end surface of the optical fiber 46 by the first collecting lens 62. Fluorescence generated by the fluorescent body 60c travels to an end surface of the optical fiber 46 as it is. When the fluorescent bodies 60b and 60c are disposed directly at the optical fiber 46 as above, loss of the probe light including fluorescence is less.

As described above, the measuring apparatus 40 according to the present embodiment includes the light source unit 44 having the excitation light source 56, the fluorescent body 60, and the first collecting lens 62. The excitation light 58 output from the excitation light source 56 is focused on the fluorescent body 60 by the first collecting lens 62, and the fluorescent body 60 is caused to generate fluorescence with a wavelength different from that of the excitation light 58. Further, the measurement-target object can be irradiated with light (probe light 66) including this fluorescence through the optical fiber 46 and the light collector 48. In this case, light including a wide wavelength band that can be used for measurement can be formed with use of a monochromatic light source having high output power and a small spot diameter. Further, the fluorescence included in this light (probe light 66) also has a small diameter, and therefore it is easy to focus the fluorescence on an end surface of the optical fiber 46. Thus, in the measuring apparatus 40 according to the present embodiment, the measurement-target object can be irradiated with the light with high efficiency with a sufficient light amount without using an expensive, large-size light source like a super continuum light source.

The present invention is not limited to the description of the above embodiment and can be carried out with various changes. For example, in the above-described embodiment, the case in which the measuring apparatus 40 is used in such a manner as to be incorporated in the laser processing apparatus 2 has been explained. However, the aspect of the present invention is not limited thereto. For example, the measuring apparatus 40 according to the aspect of the present invention may be used in such a manner as to be incorporated in a grinding apparatus that grinds the wafer 1 that is a workpiece from the side of the back surface 1b. Further, the measuring apparatus 40 according to the aspect of the present invention may be used independently of a processing apparatus or the like.

Besides, structures, methods, and so forth according to the above-described embodiment can be carried out with appropriate changes without departing from the range of the object of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A measuring apparatus comprising:
   a holding table that holds a measurement-target object; and
   a measuring unit that measures a height or a thickness of the measurement-target object held by the holding table,
   the measuring unit including
      a light source unit,
      an optical fiber that guides light emitted by the light source unit, and
      a light collector that focuses the light guided by the optical fiber on the measurement-target object held by the holding table,
   the light source unit including
      an excitation light source that emits excitation light,
      a fluorescent body that emits fluorescence with a wavelength different from that of the excitation light when receiving the excitation light emitted by the excitation light source, and
      a first collecting lens that focuses the excitation light emitted by the excitation light source on the fluorescent body,
   wherein the measurement-target object is irradiated with the fluorescence emitted by the fluorescent body.

2. The measuring apparatus according to claim 1, wherein the fluorescent body is disposed on a reflective substrate, and
   the light source unit further includes
      a dichroic mirror that is disposed between the first collecting lens and the fluorescent body and allows the excitation light to be transmitted through the dichroic mirror and reflects the fluorescence, and
      a second collecting lens that focuses the fluorescence reflected by the dichroic mirror on the optical fiber.

3. The measuring apparatus according to claim 1, wherein the fluorescent body is disposed on a reflective substrate, and
   the light source unit further includes
      a dichroic mirror that is disposed between the first collecting lens and the fluorescent body and reflects the excitation light and allows the fluorescence to be transmitted through the dichroic mirror, and
      a second collecting lens that focuses the fluorescence transmitted through the dichroic mirror on the optical fiber.

4. The measuring apparatus according to claim 2, wherein a cooling mechanism that cools the fluorescent body is coupled to the reflective substrate on which the fluorescent body is disposed.

5. The measuring apparatus according to claim 3, wherein a cooling mechanism that cools the fluorescent body is coupled to the reflective substrate on which the fluorescent body is disposed.

6. The measuring apparatus according to claim 1, wherein the fluorescent body is disposed on a transparent substrate, and
   the light source unit further includes
      a second collecting lens that focuses the fluorescence that is emitted by the fluorescent body and that is transmitted through the transparent substrate on the optical fiber.

7. The measuring apparatus according to claim 6, wherein the fluorescent body is disposed with a shape including an annular region on the transparent substrate that has a rotating shaft and that is circular, and
   the light source unit further includes
      a rotational drive source that suppresses a temperature rise of the fluorescent body by rotating the transparent substrate around the rotating shaft.

8. The measuring apparatus according to claim 2, wherein the fluorescent body is disposed with a shape including an annular region on the reflective substrate that has a rotating shaft and that is circular, and
   the light source unit further includes
      a rotational drive source that suppresses a temperature rise of the fluorescent body by rotating the reflective substrate around the rotating shaft.

9. The measuring apparatus according to claim 3, wherein the fluorescent body is disposed with a shape including an annular region on the reflective substrate that has a rotating shaft and that is circular, and
   the light source unit further includes
      a rotational drive source that suppresses a temperature rise of the fluorescent body by rotating the reflective substrate around the rotating shaft.

10. The measuring apparatus according to claim 1, wherein
    the fluorescent body is buried in the optical fiber.

11. The measuring apparatus according to claim 1, wherein
    the fluorescent body is disposed on an end surface of the optical fiber.

12. The measuring apparatus according to claim 1, wherein
    the excitation light source is a laser diode.

* * * * *